(12) United States Patent
Tsujimoto

(10) Patent No.: US 6,271,841 B1
(45) Date of Patent: *Aug. 7, 2001

(54) INFORMATION PROCESSOR FOR CHANGING A DISPLAY IN RESPONSE TO AN INPUT AUDIO SIGNAL

(75) Inventor: Taizou Tsujimoto, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/285,275

(22) Filed: Apr. 2, 1999

Related U.S. Application Data

(63) Continuation of application No. 08/877,242, filed on Jun. 17, 1997, now Pat. No. 5,969,719, which is a continuation of application No. 08/558,972, filed on Nov. 13, 1995, now abandoned, which is a continuation of application No. 08/070,681, filed on Jun. 2, 1993, now abandoned.

(30) Foreign Application Priority Data

Jun. 2, 1992 (JP) ................................... 4-141305
May 25, 1993 (JP) ................................... 5-122350

(51) Int. Cl.[7] ................................................. G06F 9/00
(52) U.S. Cl. ..................................... 345/349; 345/302
(58) Field of Search .................................. 345/328, 333, 345/334, 335, 346, 348, 349, 473, 474, 435

(56) References Cited

U.S. PATENT DOCUMENTS

| | | | |
|---|---|---|---|
| 4,757,525 | * 7/1988 | Matthews et al. | 379/197 |
| 5,148,154 | * 9/1992 | Mackay et al. | 345/328 |
| 5,212,733 | 5/1993 | DeVitt et al. | |
| 5,339,392 | * 8/1994 | Risberg et al. | 345/333 |
| 5,402,499 | 3/1995 | Robison et al. | |
| 5,402,501 | * 3/1995 | Silfvajt et al. | 381/119 |
| 5,467,288 | 11/1995 | Fasciano et al. | |
| 5,856,830 | * 1/1999 | Yamamoto | 345/474 |

FOREIGN PATENT DOCUMENTS

| | | |
|---|---|---|
| 64-7226 | 1/1989 | (JP) . |
| 1-120595 | 5/1989 | (JP) . |
| 2-257332 | 10/1990 | (JP) . |

* cited by examiner

*Primary Examiner*—Raymond J. Bayerl
*Assistant Examiner*—Cao H. Nguyen
(74) *Attorney, Agent, or Firm*—McDermott, Will & Emery

(57) ABSTRACT

In a situation where a moving picture, representing a person playing the piano, is being displayed on a screen responsive to an animation signal, while a human voice reporting an item of news is being output responsive to an audio signal with a caption displayed on the screen as an icon image, a comparator continuously compares information such as "Next, we will have the weather forecast . . . " contained in the voice with another information like "weather" prescribed by an operator. The moment a correspondence is found between these pieces of information, the caption, which has been displayed as an icon image, is turned into a window. In this manner, information contained in an audio signal is always monitored and when a predetermined condition is met, an icon image is changed into a window automatically and timely. Accordingly, an operator need not perform a troublesome operation of manually changing an icon image into a window.

3 Claims, 10 Drawing Sheets

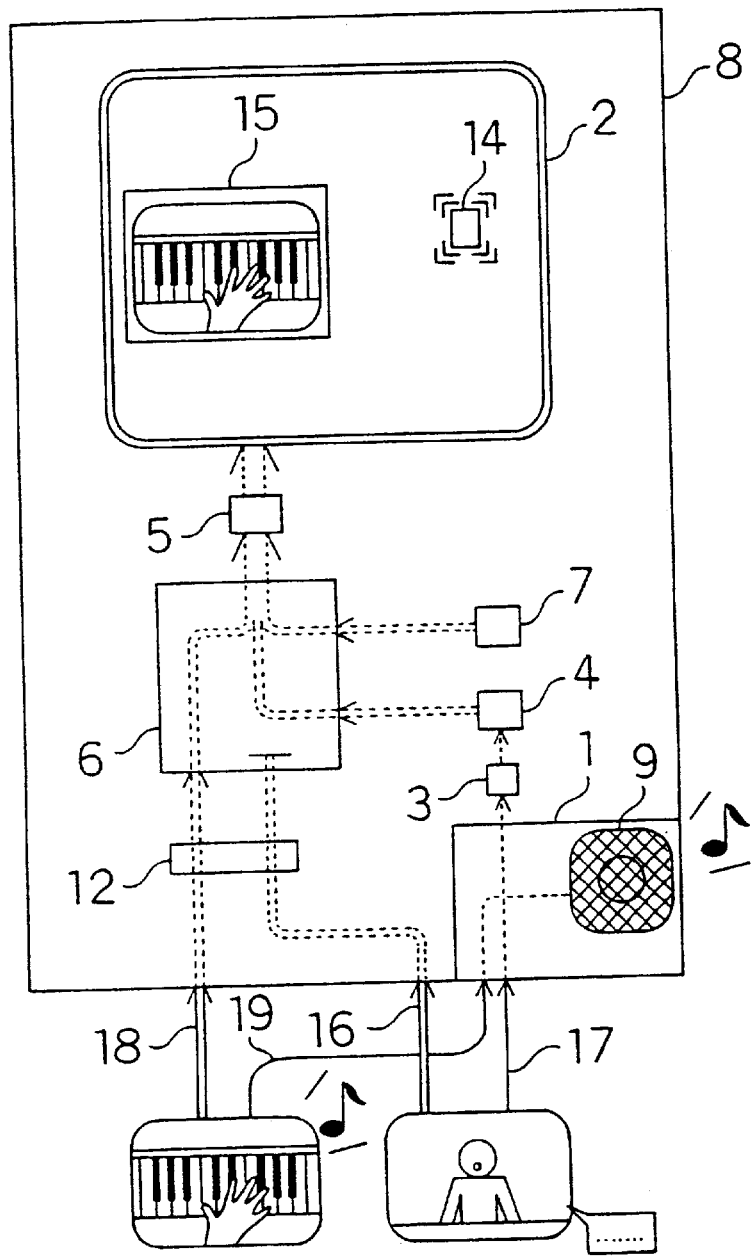
FIG. 2(a)
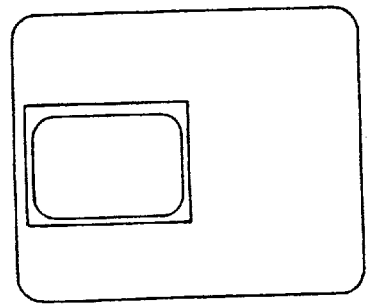
FIG. 2(b)
FIG. 2(c)

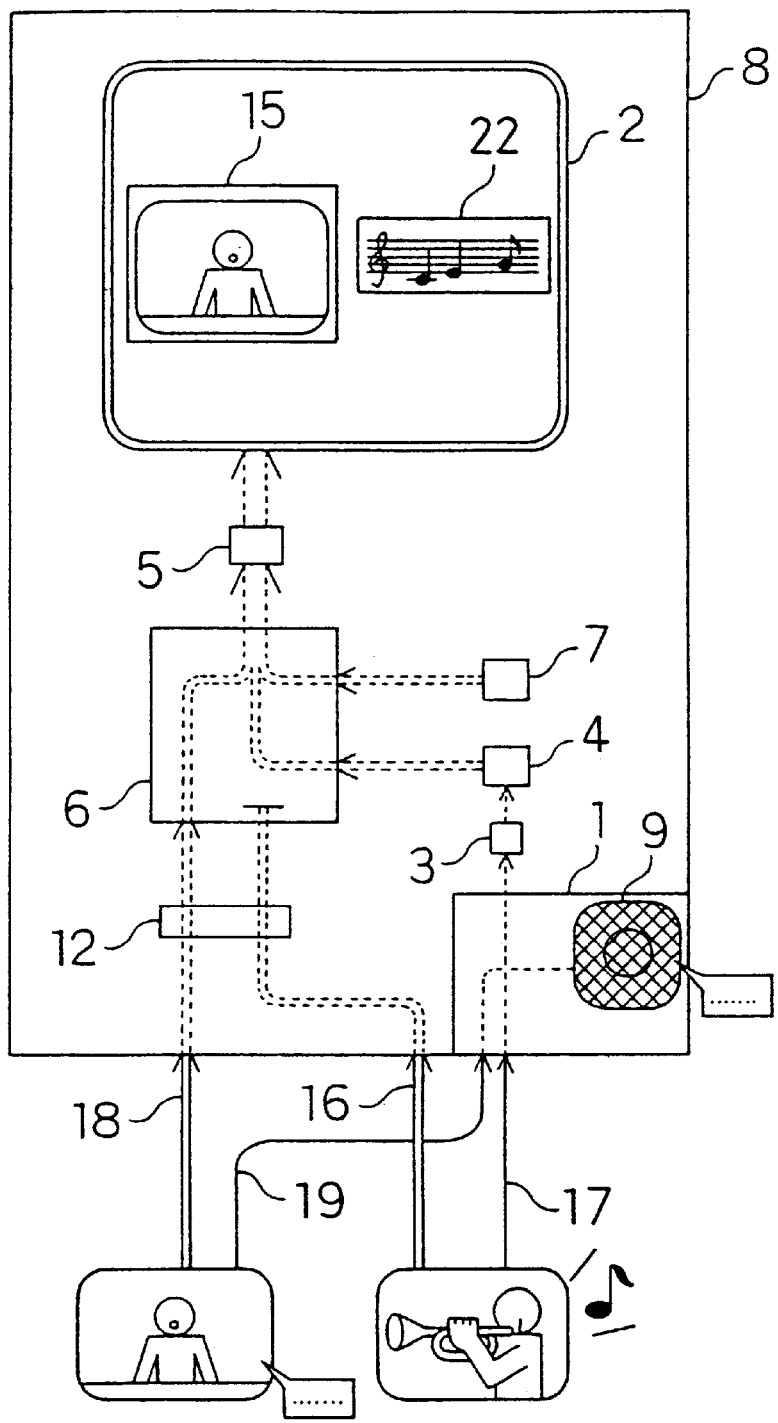
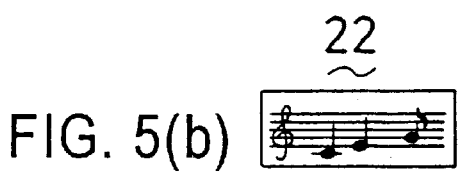

INFORMATION PROCESSOR FOR CHANGING A DISPLAY IN RESPONSE TO AN INPUT AUDIO SIGNAL

This is a continuing application of Ser. No. 08/877,242, filed Jun. 17, 1997. now U.S. Pat. No. 5,969,719, which is a continuation of application of Ser. No. 08/558,972, filed on Nov. 13, 1995, now abandoned, which is a continuation of application of Ser. No. 08/070,681, filed Jun. 2, 1993, now abandoned.

BACKGROUND OF THE INVENTION

This invention relates to an improved information processor that has not only audio signal input capability but also a display screen of a display unit.

Recent development in information processing technologies has realized various multi-media information processors, many of which have audio signal input/output capability together with animated image display capability. Such a multi-media information processor generally employs a multi-window display system to display different information simultaneously and independently on different areas called "windows" resulting from splitting the display screen of the information processor. And plural icons are usually displayed so that an operator can activate any one of them in the information processor using a device called a mouse.

In a conventional multi-window display system, a window, in which information that is not currently referred to by an operator is being displayed, can be minimized to display an alternative to that window, i.e., an icon image with a smaller area. Thus, the area of a screen is effectively used. When minimizing an unnecessary window to display it as an icon image, a pattern to be applied to the icon image is read from a corresponding memory for display. Thereafter, such an icon image is displayed as a still image keeping the same pattern until it is activated to open a window.

There are several types of icon images capable of changing their patterns whilst being displayed on the screen of a display unit. For example, when an icon image is selected by an operator with a mouse for initiating input operations, such an icon image changes its pattern so as to indicate its current status of "being selected". For the case of an icon image of a clock, such an icon image can change its pattern so as to show time. For the case of an icon image indicative of whether any electronic mail has been received, it can change its pattern when a monitoring system detects the reception of an electronic mail. However, it will take at least a period of some several seconds for an icon image to be able to change its pattern. Any shorter period than that results in disadvantageously increasing the burden to be handled by a CPU. This prevents conventional techniques from producing an icon image which shows no awkward movements.

There are several drawbacks presented by conventional information processors of the type having audio signal input capability and display screen of a display unit.

For example, with a first piece of information being displayed in a first window, and with a first audio signal corresponding to the first piece of information being output through a loudspeaker in the form of a sound, it the first window is minimized and displayed as an icon image in order that a second piece of information is displayed in a second window, both the first and second audio signals will be output as respective sounds at the same time. This causes listening confusion to an operator.

Meanwhile, if an audio signal corresponding to information of a minimized window in the form of an icon image is stopped, that is to say, if such an audio signal is not output currently through a loudspeaker in the form of a sound, this allows an operator to clearly hear a sound corresponding to information displayed in a new-opened window. However, this presents a problem that it is very hard for an operator to visually realize that there exists a concealed sound behind a minimized window now in the form of an icon image, since such a minimized window is displayed as a still image with no motion.

SUMMARY OF THE INVENTION

Bearing in mind the foregoing disadvantages in the prior art techniques, the present invention was made. It is a general object of this invention to provide an improved information processor that has not only audio signal input capability but also a display screen of a display unit. For example, while an icon image is being displayed on the display screen of the display unit, the information processor of the present invention can turn the icon image displayed into a window automatically and timely in response to an audio signal.

To achieve this object, the information processor of the present invention includes: a display unit having a display screen; audio signal input means for inputting an audio signal; display control means for controlling display on the display screen of the display unit; and comparison means for comparing information contained in an audio signal, input by the audio signal input means, with another information prescribed by an operator to determine whether or not a predetermined condition is satisfied. The display control means changes a mode of display on the display screen of the display unit in accordance with results of the comparison performed by the comparison means.

In one embodiment of the present invention, if the predetermined condition is satisfied, then the display mode on the display screen of the display unit is changed in such a manner as to turn an icon image displayed into a window.

In another embodiment of the present invention, a plurality of windows are defined within the display screen of the display unit.

In still another embodiment, if the predetermined condition is satisfied, then the display mode on the display screen of the display unit is changed in such a manner as to turn at least one of the windows displayed into an icon image.

In still another embodiment, the icon image is displayed as an animated picture.

Suppose a piece of information contained in an audio signal supplied turns out to match with another piece of information prescribed by an operator while predetermined data such as a document is being displayed on the display screen of the display unit as an icon image, not as a window. In such a situation, since a predetermined condition of comparison has been met, the information processor of the present invention instantaneously turns the icon image into a window automatically and timely. Accordingly, an operator need not perform that troublesome operation of manually changing an icon image into a window. Furthermore, if the contents within the newly displayed window include any information that the operator wants to collect, then the operator can catch every bit of such information inside the window without missing any part of it.

In particular, if another window has already been displayed on the display screen when the icon image is automatically turned into a window, then the former window is minimized into an icon image. Thus, even such a preexisting window does not interfere with automatically changing an icon into a window.

BRIEF DESCRIPTION OF THE DRAWINGS

Other objects, features, and advantages of the present invention will be more clearly understood from the following description when considered in conjunction with the accompanying drawings wherein:

FIG. 2 shows how the information processor of the first embodiment operates;

FIG. 5 shows how an information processor of a fourth embodiment of the invention operates;

DESCRIPTION OF THE PREFERRED EMBODIMENTS

With reference to the accompanying drawings, preferred embodiments of the present invention are now described below. In this invention, by an expression like "to display a signal on a screen" or "a signal is displayed on a screen", what is meant is that information corresponding to the signal is displayed as an image on a screen.

First Embodiment

Figure 1:
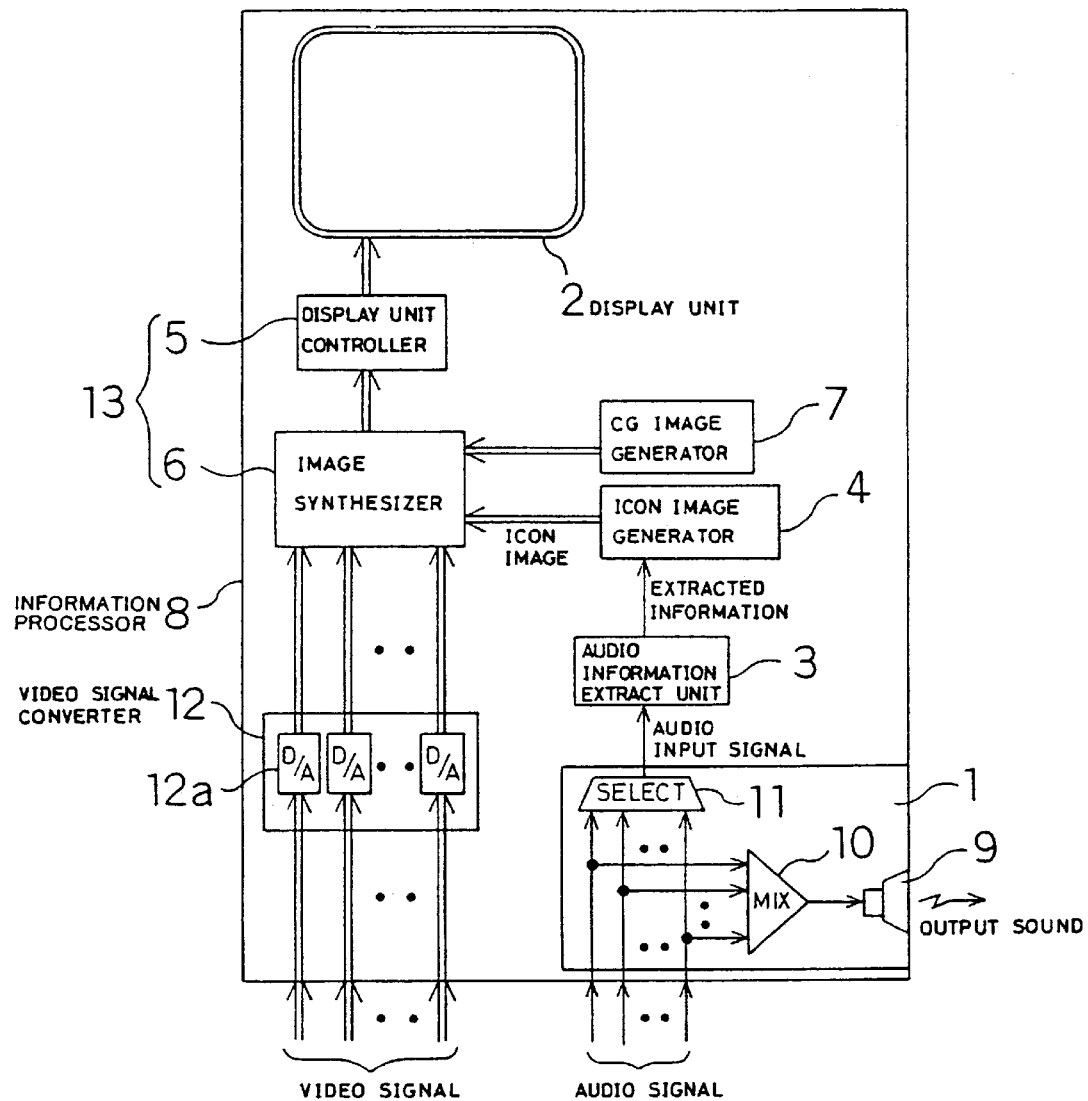
FIG. 1 is a block diagram showing the configuration an information processor of a first embodiment of the invention.

FIG. 1 schematically shows an information processor 8 which comprises an audio signal input/output unit 1, a display unit 2, an audio information extract unit 3, an icon image generator 4, a display unit controller 5, an image synthesizer 6, a CG (computer graphic) image generator 7, and a video signal converter array 12.

The audio signal input/output unit 1 is fed with external audio signals, and is composed of a loudspeaker 9, an audio signal mixing/amplifying unit 10, and an audio signal selector 11. The audio signal mixing/amplifying unit 10 has a mixing function so that it can perform the function of weighting each audio signal according to a predetermined weight. After summing numerical values obtained by such weighting, the audio signal mixing/amplifying unit 10 outputs calculation results through the loudspeaker 9. Further, this mixing function of the audio signal mixing/amplifying unit 10 includes a selective output function so as to exclusively output a particular audio signal selected from among the audio signals, or to stop outputting a particular audio signal. The foregoing weight is variable. The audio signal selector 11 performs the function of selectively outputting, from among the audio signals, an audio signal that has not been output due to the selective output function of the audio signal mixing/amplifying unit 10.

Although not shown in FIG. 1, the display unit 2 plurality of windows on its screen.

Upon receiving an audio signal delivered from the audio signal selector 11, the audio information extract unit 3 extracts a volume level of that audio signal as real-time information.

According to the volume level extracted by the audio information extract unit 3 as real-time information, the icon image generator 4 generates an icon image. More specifically, the icon image generator 4 generates, according to the extracted volume level, an icon image whose size varies with time as shown in FIG. 2(c). This makes such an icon image look animated.

As shown in FIG. 2(b), the CG image generator 7 performs the function of generating a still image which serves as a window on the screen of the display unit 2.

The video signal converter array 12 comprises plural digital-to-analog converters (DAC's) 12a. Each of the DAC's 12a converts analog video signals into digital video signals, thereafter outputting them.

The image synthesizer 6 performs the function of selecting a predetermined video signal from among the video signals delivered from the video signal converter array 12 so as to display the selected video signal in a window generated by the CG image generator 7. The image synthesizer 6 performs the further function of synthesizing video signals, still pictures, and icon images in order to display an icon image generated by the icon image generator 4 on a predetermined area of the screen 10 of the display unit 2.

Based on a signal synthesized by the image synthesizer 6, the display unit controller 5 performs the function of controlling the display unit 2 so that a video signal and icon image are displayed on the screen of the display unit 2.

The display unit controller 5 and the image synthesizer 6 together constitute a display controller 13. Under control of the display controller 13, an icon image generated by the icon image generator 4 is displayed on the screen of the display unit 2 instead of information corresponding to the audio signal from which the real-time information has been extracted.

The operation of the information processor 8 with the above-described configuration is explained by reference to FIG. 2. In FIG. 2, an icon image obtained by minimizing a particular window is indicated by reference numeral 14, an image displayed in another window by reference numeral 15, a first video animation signal by reference numeral 16, a first audio signal corresponding to the first video animation signal 16 by reference numeral 17, a second video animation signal by reference numeral 18, and a second audio signal corresponding to the second video animation signal 18 by reference numeral 19. Although neither the audio signal mixing/amplifying unit 10 nor the audio signal selector 11 is shown in FIG. 2, their functions are represented by the flow of signals.

As an example, consider a case in which, while the first video animation signal 16 (announcer) is being displayed in a first window of the screen of the display unit 2 and the first audio signal 17 (voice tone) is being output through the loudspeaker 9, the second video animation signal 18 (pianist) is displayed in a second window and the second audio signal 19 (piano sound) is output in the form of a sound through the loudspeaker 9 after it has been selected at the audio signal input/output unit 1. This case will be explained below.

In this case, the audio signal mixing/amplifying unit 10 (not shown) prevents the first audio signal 17 from passing through the loudspeaker 9. This first audio signal 17 which is stopped by the unit 10 is forwarded to the audio information extract unit 3 from the audio signal selector 11. The audio information extract unit 3 then extracts a volume level from the first audio signal 17 as real-time information, thereafter forwarding it to the icon image generator 4. The icon image generator 4 reduces or enlarges the size of a predetermined icon image according to the volume level extracted by the audio information extract unit 3 thereby producing an animated icon image. After combined with the second video animation signal 18 by the image synthesizer 6, such an animated icon image is displayed on the screen of the display unit 2 under control of the display controller 5, as the animated icon image 14.

The animated icon image 14 varies its size in order to show an operator the fact that it corresponds to the second audio signal 17, as a result of which it is very easy for an operator to visually recognize that the audio signal 17 is correspondingly existent with respect to the icon image 14. Since the loudspeaker 9 sends out only the second audio signal 19 (piano sound) while the first audio signal 17 (voice tone) is being stopped, this causes no problems for the operator to listen to piano sounds.

In the foregoing description, the animated icon image 14 is generated according to the volume level of the first audio signal 17 which is not output currently in the form of a sound through the loudspeaker 9. By changing the icon image 14 into a much more conspicuous one at the point that the volume level of the first audio signal 17 goes beyond a predetermined value, it is possible to monitor excessive volume levels.

Second Embodiment

Figure 3A:
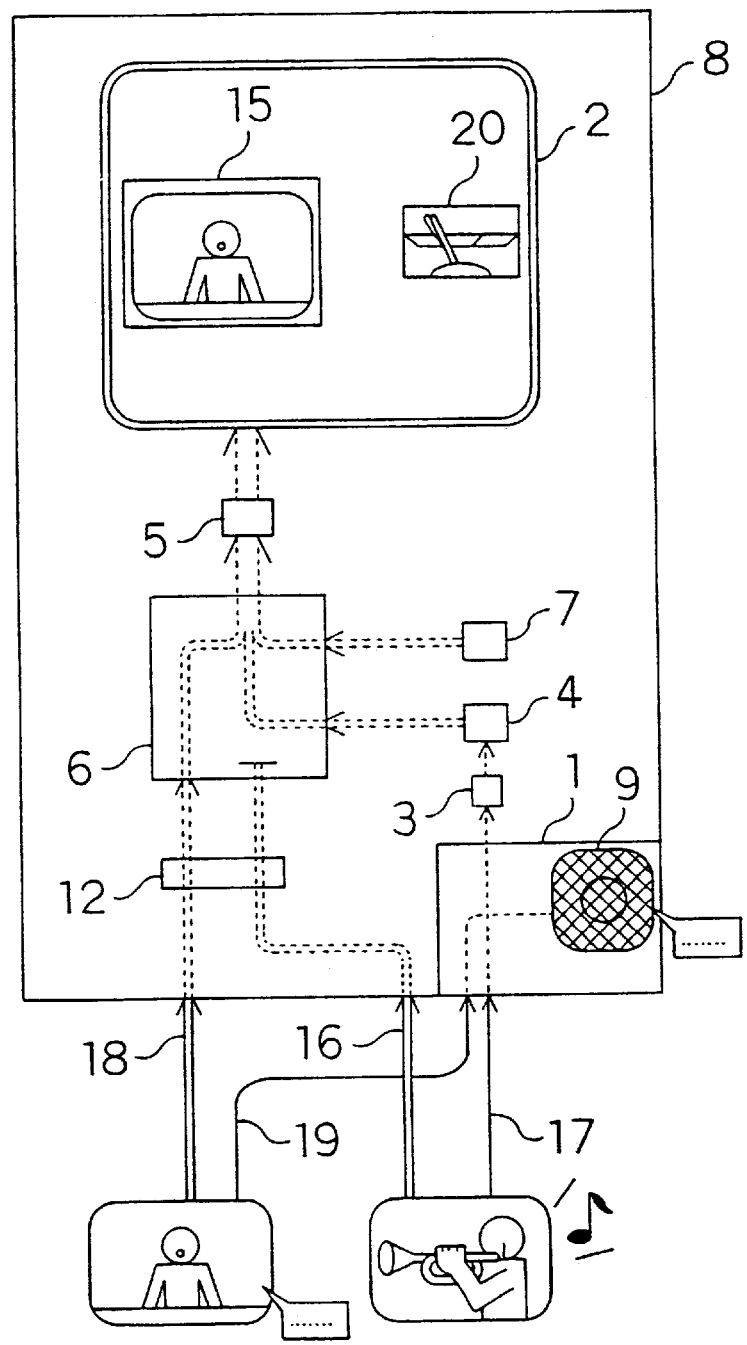
FIG. 3 shows how an information processor of a second embodiment of the invention operates.
Figure 3B:

A second embodiment of the present invention is described by referring to FIG. 3. The first video animation signal 16, which corresponds to the audio signal 17 which is not output currently in the form of a sound through the loudspeaker 9, represents an animated image of a trumpeter. The icon image generator 4 generates an animated icon image 20 of a volume level indicator as shown in FIG. 3(b) which indicates, with time, volume levels extracted by the audio information extract unit 3 from the audio signal 17 (trumpet sound).

This embodiment makes it possible for an operator to monitor the volume level of the audio signal 17 which is not output currently in the form of a sound through the loudspeaker 9.

Third Embodiment

Figures 4A, 4B:
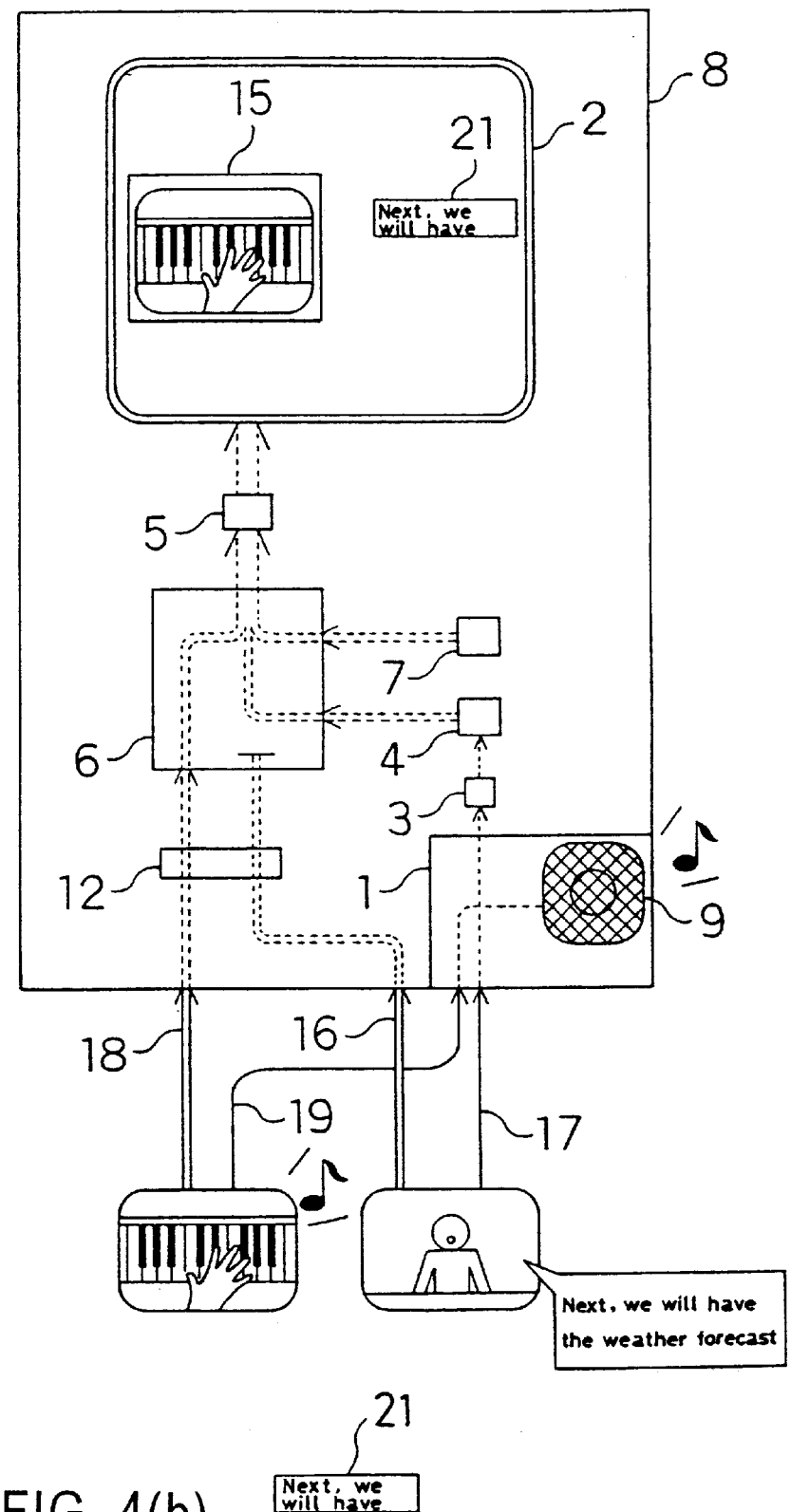
FIG. 4 shows how an information processor of a third embodiment of the invention operates.

A third embodiment of the present invention is described by reference to FIG. 4. Here, the first video animation signal 16, which corresponds to the audio signal 17 which is not output currently in the form of a sound through the loudspeaker 9, represents an animated image of an announcer who is reading something, say, an item of news. The audio information extract unit 3 extracts a sentence as real-time information by means of the speech recognition of the audio signal 17 (for example, such a sentence may be "Next, we will have the weather forecast . . . " as shown in FIG. 4). The icon image generator 4 meanwhile generates an animated news caption 21 (FIG. 4(a),(b)) according to the sentence extracted by the audio information extract unit 3.

In this embodiment, it is possible to monitor the contents of the audio signal 17 which is not output currently in the form of a sound through the loudspeaker 9.

Fourth Embodiment

A fourth embodiment of the present invention is described by reference to FIG. 5. The first video animation signal 16, which corresponds to the audio signal 17 which is not output currently in the form of a sound through the loudspeaker 9, represents an animated image of a trumpeter. The audio information extract unit 3 extracts, with time, a pair of a pitch and a length as real-time information by recognizing the musical note within the audio signal 17 (trumpet sound). The icon image generator 4 meanwhile generates a music sheet 22 as an animated icon image carrying thereon musical notes (each of which has a pair of a pitch and a length) extracted by the audio 10 information extract unit 3 from the audio signal 17.

In this embodiment, it is possible to monitor the contents of an audio signal which is not output currently in the form of a sound through the loudspeaker 9. Because of this, such a monitor function is most beneficial when audio signals represent music sounds. Additionally, automatic transcription is made available by storing in a storage medium a music sheet composed automatically with extracted musical notes. Further, it is also possible to monitor the process of automatic transcription by displaying the music sheet as an animated icon image in real time while at the same time storing it.

Fifth Embodiment

Figure 6A:
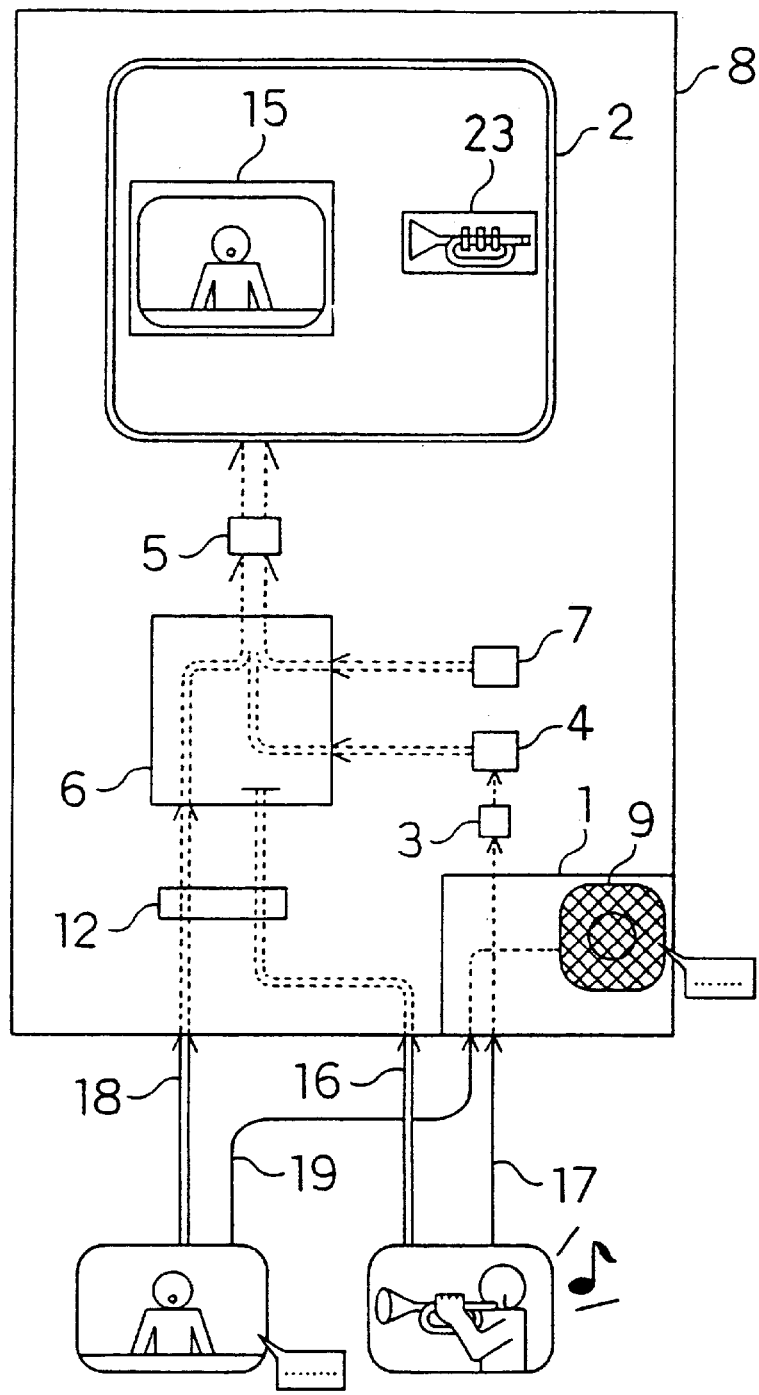
FIG. 6 shows how an information processor of a fifth embodiment of the invention operates.
Figure 6B:
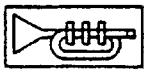

FIG. 6 shows a fifth embodiment of the invention. In this embodiment, at the same condition as that of the fourth embodiment of FIG. 5, the audio information extract unit 3 performs the function of recognizing the audio signal's 17 sound source as real-time information, thereby extracting a result of sound source recognition (trumpet), and the icon image generator 4 meanwhile generates a pattern 23 of a trumpet according to such a sound source recognition result, as shown in FIG. 6(b).

In this embodiment, it is possible to monitor the sound source of an audio signal which is not output currently in the form of a sound through the loudspeaker 9, and to give some indication as to the type of the audio signal. This embodiment makes use of a pattern of a trumpet, however, the exact word "trumpet" may be displayed as an icon image.

In the foregoing description, the audio information extract unit 3 extracts real-time information in the form of a volume level, however, an audio signal envelop may be extracted by the audio information extract unit 3 as real-time information, which simplifies circuitry of the audio information extract unit 3. Further, the full frequency spectrum of an audio signal or part of it may be extracted as real-time information. In this case, a frequency spectrum measuring function is added, so that it is possible to display a signal level at a particular frequency.

Further, in the foregoing description, to accomplish animation effect, an icon image is made to change its size, however, such an effect may be obtained by making an icon image roll or move laterally, reshaping its form, or changing its colors. Creating animation effect to an icon image by making it move laterally over a screen is advantageous in that the icon image generator 4 will have a simpler circuit configuration. There is an advantage in reshaping an icon image that a most conspicuous animated icon image can be available by choosing an adequate icon image as a reference icon image. For the case of changing icon image colors, unwanted overlapping between an icon image and a different window or another icon image can he prevented, since this process involves no changes as to display areas. There is another technique for producing animation effect to an icon image, in which each frame of an icon image is pre-stored in a storage for every cod of real-time information, and every time each cod is extracted a corresponding frame of the icon image is read from the storage to make it become animated as a whole. In this case, by preparing many frames of an icon image in advance to prevent the icon image from moving awkwardly, it is possible to display a most conspicuous animated icon image.

Sixth Embodiment

Figure 7:
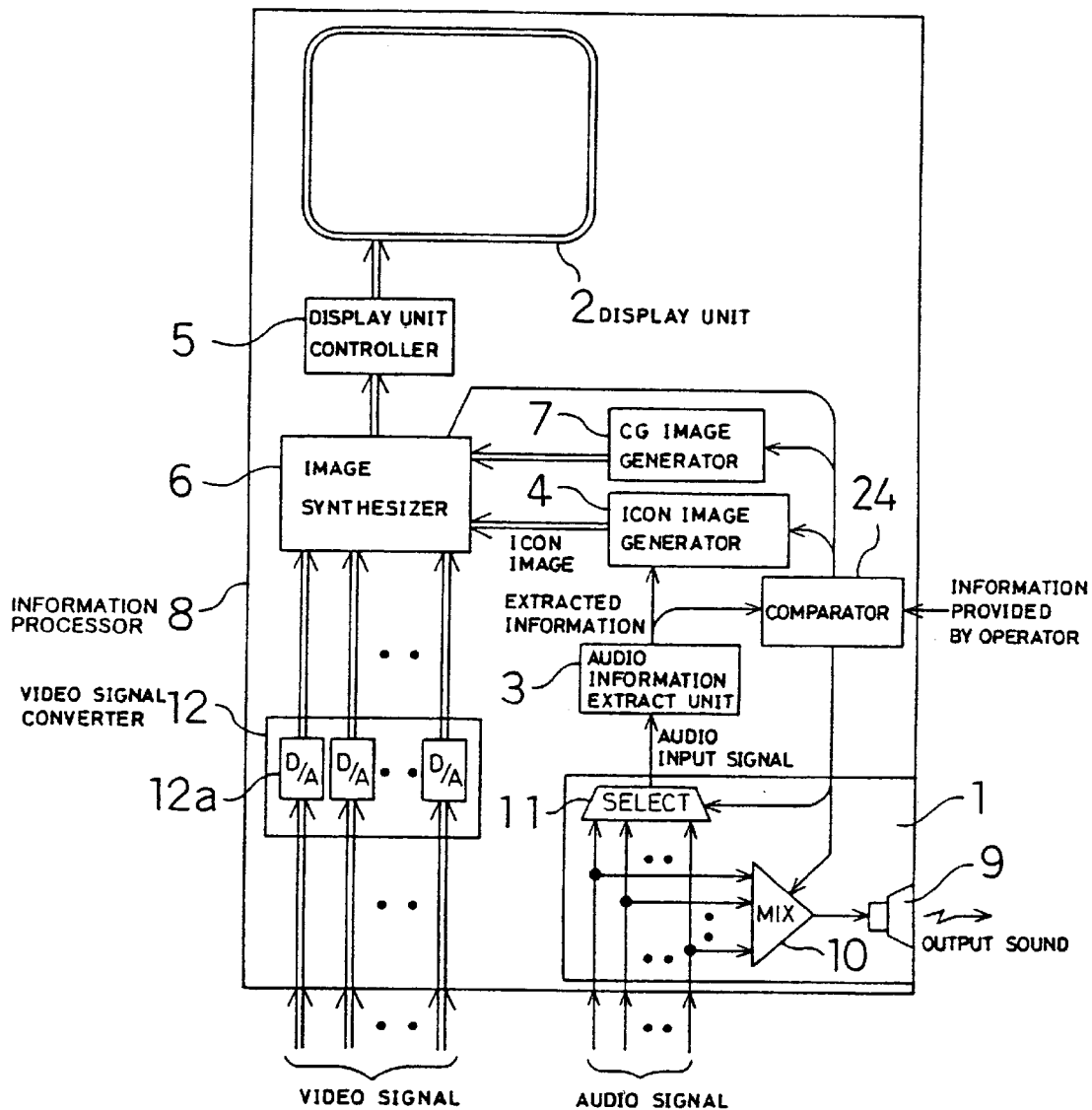
FIG. 7 is a block diagram showing the configuration of an information processor of a sixth embodiment of the invention.

A sixth embodiment of the present invention is explained. This embodiment, as seen from FIG. 7, further includes a comparator 24 in addition to the elements described in the first embodiment of FIG. 1. The comparator 24 stores in advance predetermined information such as a character string, and is fed with real-time information such as a sentence extracted by the audio information extract unit 3 from an audio signal by means of speech recognition. The comparator 24 then makes a comparison between the predetermined information and the real-time information, i.e., the sentence. When the comparator determines that a certain condition is satisfied, for example, if a correspondence exists between the real-time information and the predetermined information, the audio signal mixing/amplifying unit 10 is so controlled that every audio signal including one from which the real-time information has been extracted is weighted according to a predetermined weight, and is output through the loudspeaker 9 of the audio signal input/output unit 1 in the form of a sound. At the same time, the audio signal selector 11 is controlled not to select any one of audio signals supplied to the audio signal input/output unit 1. The icon image generator 4 is also controlled not to generate any further icon images. Further, the CG image generator 7 and the image synthesizer 6 are controlled so that the synthesis of a still picture generated by the CG image generator 7 and all the video signals delivered from the video signal converter array 12 is made to display a synthesized signal on the screen of the display unit 2. The remaining elements are not described here, since they are identical to those shown in FIG. 1. The same reference numerals are assigned to them, accordingly.

Figure 8:
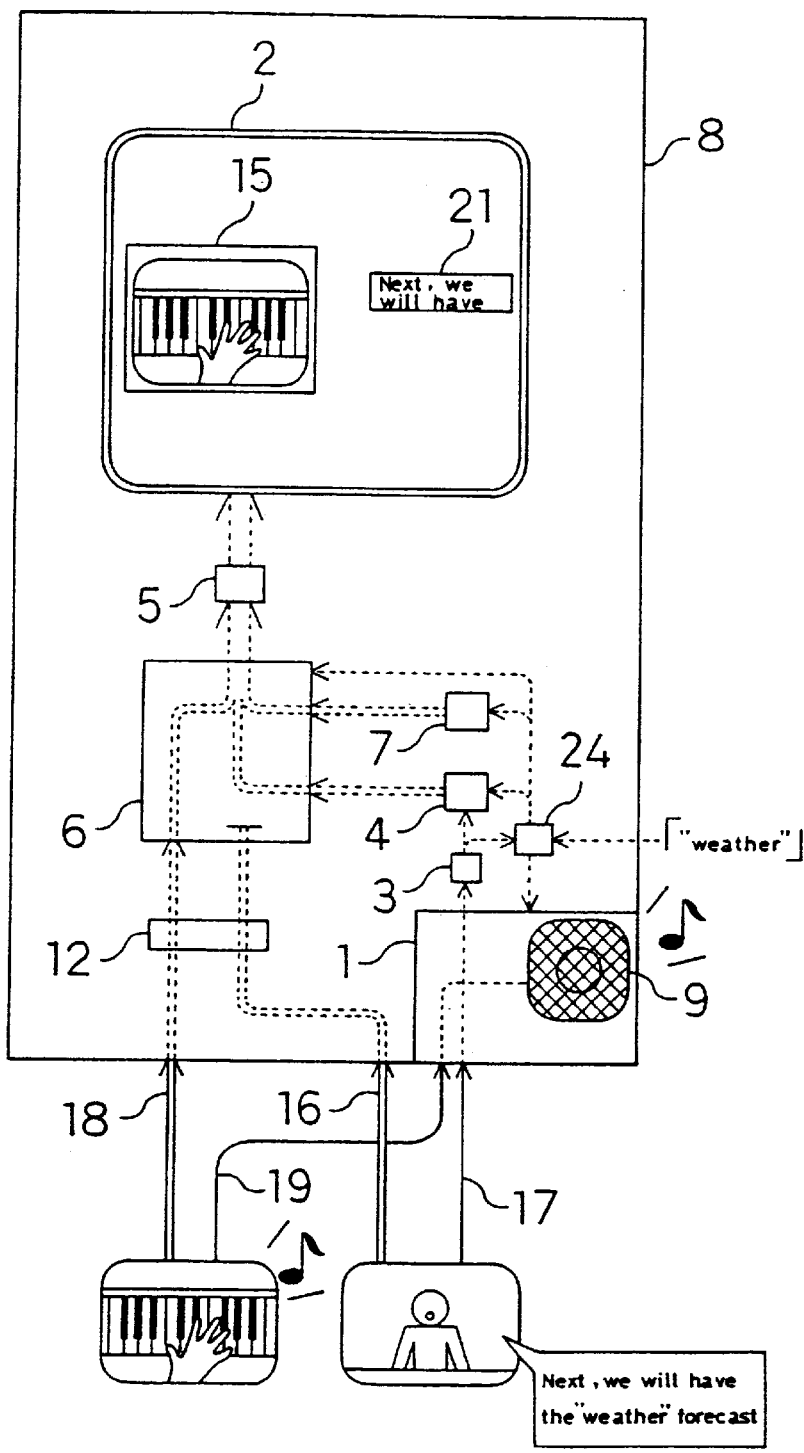
FIG. 8 is a diagram describing operations of the information processor of the sixth embodiment before the detection of a correspondence.
Figure 9:
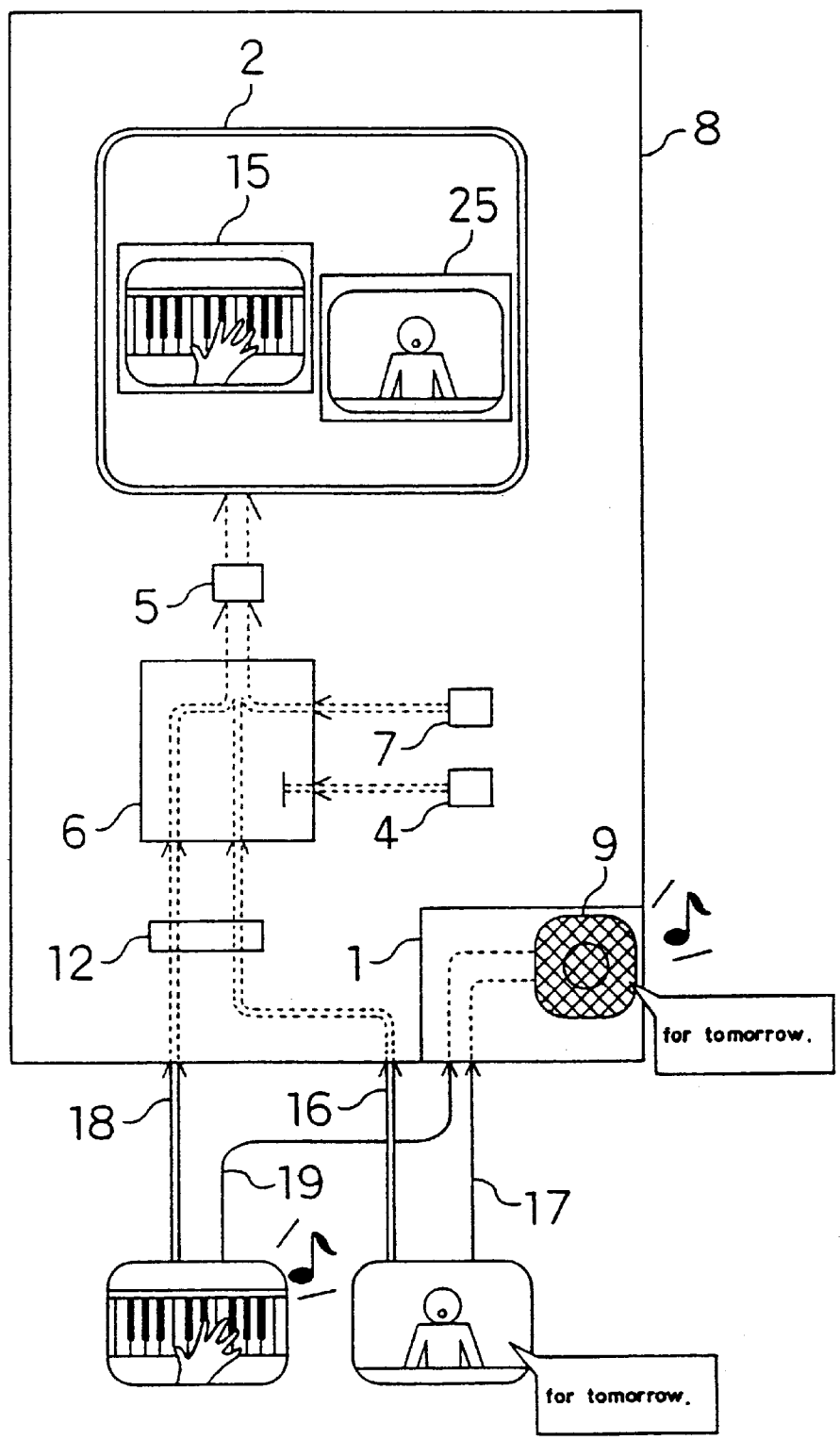
FIG. 9 is a diagram describing operations of the information processor of the sixth embodiment after the detection of a correspondence.

The operation of the information processor 8 according to this embodiment is described by reference to FIGS. 8 and 9. This description is made on the condition: (a) that the audio signal 17 (announcer's voice tone) is not output in the form of a sound (that is, the signal 17 is not output in the form of a sound through the loudspeaker 9), (b) that the audio information extract unit 3 extracts a sentence as realtime information by recognizing speech within the audio signal 17, (c) that the icon image generator 4 correspondingly generates the animated news caption 21 as an animated image according to the extracted sentence, and (d) that the display unit controller 5 exerts control so that the animated news caption 21 is displayed on the screen of the display unit 2. In other words, this is a status prior to FIG. 8.

Here, a sentence extracted from the audio signal 17, i.e.," Next, we will have the "weather" forecast . . . ", is fed to the comparator 24 for comparison with a particular item of information predetermined by an operator (a character string of the word "weather" in FIG. 8). When a correspondence is found between the sentence as real-time information and the predetermined information, the comparator 24 sends out a detection signal indicating such a correspondence to the audio signal input/output unit 1, the icon image generator 4, the CG image generator 7, and the image synthesizer 6. As a result, the icon image generator stops generating the animated news caption 21. The image synthesizer 6, as shown in FIG. 9, is fed with both the video animation signal 18 (pianist) and the video animation signal 16 (announcer), whereby these two video animation signals 16 and 18 are combined with their respective still pictures generated by the CG image generator 7 so as to display resulting synthesized signals in windows 15 and 25 of the screen of the display unit 2, respectively. As a result of this, the display unit 2 now displays an animated image of an announcer who is reading an item of news in the window 25 instead of displaying the animated news caption 21. In synchronism with the image synthesizer 6, the audio signal 17 is output in the form of a sound. This accordingly enables an operator to listen to every piece of information in time without missing any part of it, as well as one temporarily and deliberately excluded by the operator, by means of automatic monitoring of such information. In addition, since the animated image of an announcer reporting an item of news is now being displayed again in the window 25, the operator can timely catch every bit of information contained in the animated image.

In this embodiment, the comparator 25 makes a comparison between real-time information extracted from an audio signal and information predetermined by an operator so as to determine whether or not they agree with each other. However, if the information predetermined by an operator is a volume level having a predetermined value, for example, the comparator 25 may examine a level relationship between the real-time information and the operator's information, e.g., whether or not an extracted volume level goes beyond that predetermined value.

In this embodiment, as real-time information extracted by the audio information extract unit 3 from an audio signal, a sentence obtained by speech recognition is used for comparison with a character string previously established by an operator. Other than this, a musical note sensed by musical note recognition or a sound source identified may be used for comparison with a prescribed musical note or sound source name.

Further, in this embodiment, the generation of icon images is brought to a halt in response to a detection signal indicative of a correspondence so as to redisplay an animated image of an announcer who is reading news in a window. However, such a detection signal may be notified to an operating system as an interruption signal. This reduces the burden to be handled by the information processor which monitors signals.

Seventh Embodiment

Figure 10:
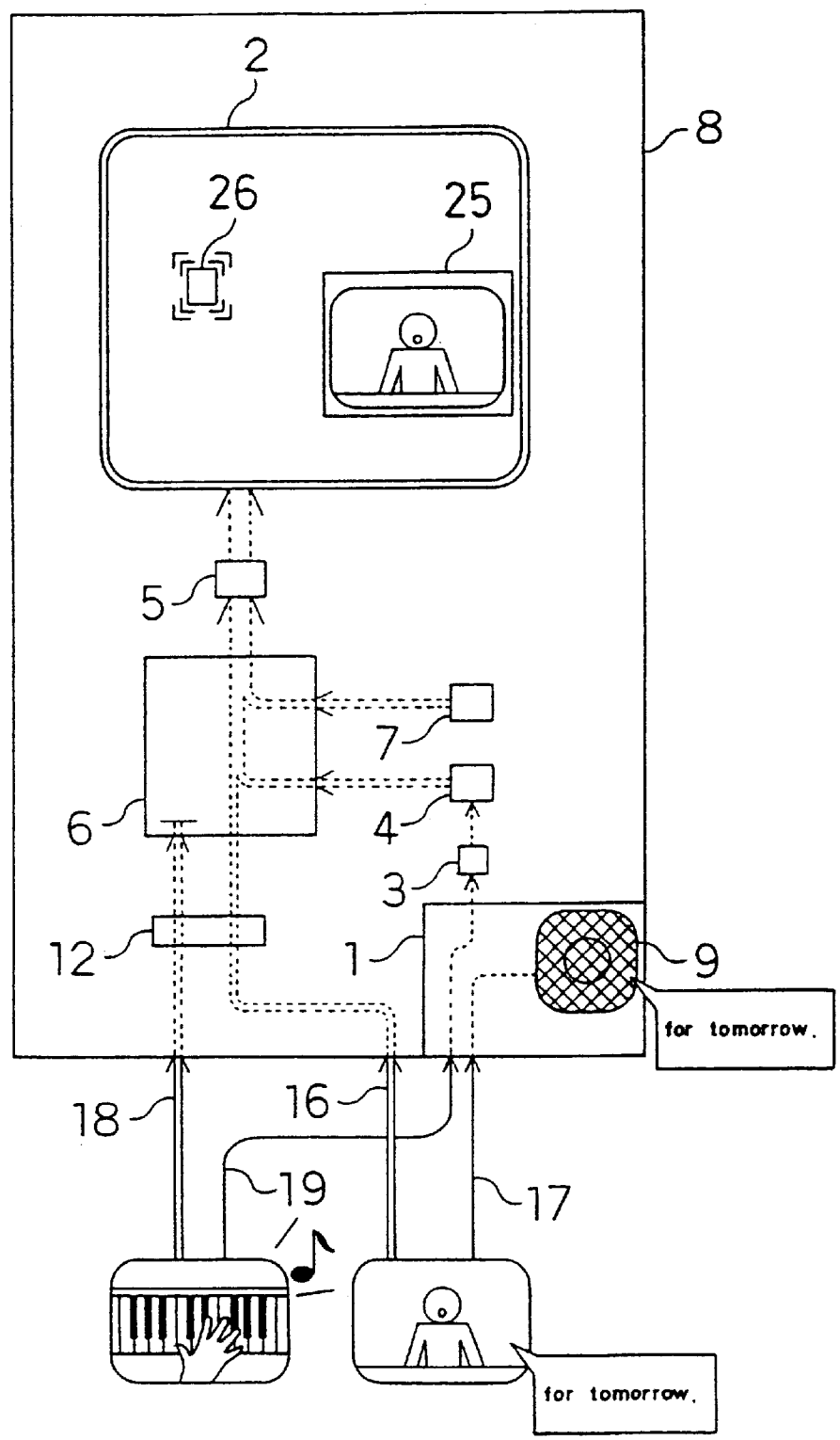
FIG. 10 shows how an information processor of as the embodiment of the invention operates.

A seventh embodiment is described by reference to FIG. 10. This embodiment is a variation of the sixth embodiment of FIG. 9. Upon detecting a correspondence between the audio signal 17 (voice tone) and information previously established, i.e., a character string of the word "weather", the audio signal input/output unit 1 stops the audio signal 16 (piano sound) from being output in the form of a sound there by outputting only the audio signal 17 in the form of a sound through the loudspeaker 9. The image synthesizer 6 stops being fed with the video animation signal 18 (pianist). The audio information extract unit 3 extracts real-time information out of the audio signal 19 (piano sound) for the generation of an animated icon image 26. Under control, both the animated icon image 26 and the animated image 25 of an announcer are displayed on the screen of the display unit 2.

In this embodiment, an operator can hear nothing but information the operator wishes to listen to, e.g., the weather forecast. In other words, no audio signals representing a piano sound are output through the loudspeaker 9 in the form of a sound. Further, since an animated image of a pianist corresponding to information that the operator does not wish to display is displayed as a small icon image, this allows the operator to listen to his or her target information more easily. In addition, since the animated image of the pianist does not interfere with the information displayed about the weather, the desired information, such as that about the weather, can be read even more easily.

What is claimed is:

1. A computer comprising:
    a display unit for displaying different information on different windows assigned on its screen;
    an audio information extract unit for extracting time-variable audio information from tine-series amplitude information which is included in an audio real time signal received from the outside;
    an icon image generator for changing one of the windows, which corresponds to the information included in the audio real time signal, to a time-variable icon having an image that conveys the time-variable audio information extracted from the audio real time signal, wherein the generated time-variable icon image varies reflective of variations in the time-variable audio information extracted from the audio real time signal;
    a display controller for controlling the display unit to display the generated time-variable icon image on the screen;
    a CG image generator for generating a still image which indicates an area of a second one of the windows; and
    an image synthesizer for synthesizing a second audio real time signal received from the outside, the still image generated by the CG image generator and the time-variable icon image generated by the icon image generator such that the second audio real time signal is displayed within the second window of which area is indicated by the still image while the time-variable icon image is displayed on a predetermined position in the screen of the display unit.

2. A computer comprising:
    a display unit for displaying different information on different windows assigned on its screen;
    an audio information extract unit for extracting time-variable audio information from tine-series amplitude information which is included in an audio real time signal received from the outside;
    an icon image generator for changing one of the windows, which corresponds to the information included in the audio real time signal, to a time-variable icon having an image that conveys the time-variable audio information extracted from the audio real time signal, wherein the generated time-variable icon image varies reflective of variations in the time-variable audio information extracted from the audio real time signal;
    a display controller for controlling the display unit to display the generated time-variable icon image on the screen;
    a comparator for comparing the time-variable audio information extracted from the audio real time signal with predetermined information and generating a signal indicating correspondence between the extracted time-variable audio information and the predetermined information, wherein the icon image generator and the display controller respond to the signal generated by the comparator;
    a CG image generator for generating a still image which indicates an area of a second one of the windows; and
    an image synthesizer for synthesizing a second audio real time signal received from the outside, the still image generated by the CG image generator and the time-variable icon image generated by the icon image generator such that the second audio real time signal is displayed within the second window of which area is indicated by the still image while the time-variable icon image is displayed on a predetermined position in the screen of the display unit.

3. A computer comprising;
    a display unit for displaying different information on different windows assigned on its screen;
    an audio information extract unit for extracting, from an audio signal received from the outside, semantic data resulting from recognizing speech with a second audio signal;
    an icon image generator for generating a time-variable icon image in the form of a caption reflective of the extracted semantic data;
    a display controller for controlling the display unit to display the generated time-variable icon image on the screen;
    a CG image generator for generating a still image which indicates an area of a second one of the window; and
    an image synthesizer for synthesizing a second audio signal received from the outside, the still image generated by the CG image generator and the time-variable icon image generated by the icon image generator such that the second audio signal is displayed within the second window of which area is indicated by the still image while the time-variable icon image is displayed on a predetermined position in the screen of the display unit.

* * * * *